(12) United States Patent
Takahashi et al.

(10) Patent No.: US 7,034,483 B2
(45) Date of Patent: Apr. 25, 2006

(54) VEHICLE STEERING APPARATUS AND METHOD FOR CONTROLLING THE SAME

(75) Inventors: Toshihiro Takahashi, Nishio (JP); Shoji Ogawa, Chiryu (JP); Hiroshi Kuroyanagi, Nagoya (JP); Shoji Asai, Nagoya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 13 days.

(21) Appl. No.: 10/859,359

(22) Filed: Jun. 3, 2004

(65) Prior Publication Data
US 2005/0017664 A1  Jan. 27, 2005

(30) Foreign Application Priority Data
Jun. 4, 2003  (JP) .............................. 2003-159885

(51) Int. Cl.
*H02P 7/00* (2006.01)
(52) U.S. Cl. ...................... 318/432; 318/433; 318/434; 318/139; 318/599; 318/811
(58) Field of Classification Search ................ 318/432, 318/139, 433, 434, 599, 811; 180/446, 443, 180/402, 6.5
See application file for complete search history.

(56) References Cited

U.S. PATENT DOCUMENTS

| 4,756,375 | A | * | 7/1988 | Ishikura et al. ............. 180/446 |
| 5,473,231 | A | * | 12/1995 | McLaughlin et al. ........ 318/433 |
| 5,475,289 | A | * | 12/1995 | McLaughlin et al. ........ 318/432 |
| 5,504,403 | A | * | 4/1996 | McLaughlin ................. 318/432 |
| 5,737,223 | A | * | 4/1998 | Matsuoka ..................... 701/41 |
| 5,998,952 | A | * | 12/1999 | McLaughlin et al. ........ 318/432 |
| 6,008,599 | A | * | 12/1999 | Beck ........................... 318/254 |
| 6,389,342 | B1 | * | 5/2002 | Kanda .......................... 701/41 |
| 6,600,280 | B1 | * | 7/2003 | Kanda ......................... 318/433 |
| 6,639,379 | B1 | * | 10/2003 | Matsushita et al. ......... 318/727 |

FOREIGN PATENT DOCUMENTS

JP    2002-274405    9/2002

* cited by examiner

*Primary Examiner*—David Martin
*Assistant Examiner*—Erick Glass
(74) *Attorney, Agent, or Firm*—Oblon, Spivak, McClelland, Maier & Neustadt, P.C.

(57) ABSTRACT

A controller of a steer-by-wire steering apparatus determines whether voltage applied to a steering motor in accordance with a current command value has reached a predetermined voltage. Based on the result, the controller selects one of the value of an actual current through the steering motor and a current command value. Based on the selected current value, an axial force applied to a steering rod is estimated. Based on the estimated axial force, a counter torque motor is controlled. Therefore, An error or oscillation occurring in the estimated steering axial force is prevented, and the driver is suppressed from further turning the steering wheel when the voltage applied to the steering motor is saturated.

20 Claims, 7 Drawing Sheets

VEHICLE STEERING APPARATUS AND METHOD FOR CONTROLLING THE SAME

CROSS-REFERENCE TO RELATED APPLICATIONS

This application is based upon and claims the benefit of priority from prior Japanese Patent Application No. 2003-159885, filed on Jun. 4, 2003, the entire contents of which are incorporated herein by reference.

BACKGROUND OF THE INVENTION

The present invention relates to a vehicle steering apparatus, and more particularly, to a steer-by-wire steering apparatus. The present invention also pertains to a method for controlling the apparatus.

FIG. 7 is a diagrammatic view showing a conventional steer-by-wire vehicle steering apparatus. A manipulation mechanism 500 has a steering wheel angle sensor, not shown, for detecting the steering angle of a steering wheel 510 operated by the driver, and has a gear ratio converting section 540 for generating a steered wheel position command based on the steering angle, and passing it to a steering mechanism 600. The steering mechanism 600 drives a steering motor 610 in accordance with a steered wheel position command given from the manipulation mechanism 500, to steer the steered wheels T via a steering rod 620.

A steering axial force estimating section 700 estimates a steering axial force applied from the road surface to the steering rod 620 in a disturbance observer section 710, and generates a counter torque command to be applied to the steering wheel 510 in a counter torque command generating section 720. A counter torque motor control section 530 of the manipulation mechanism 500 drives a counter torque motor 520 in accordance with the counter torque command given from the steering axial force estimating section 700, and conveys a counter torque to the driver.

FIG. 8 is a control block diagram of a steering motor control section 630 in the steering mechanism 600. In this control block diagram, a steering motor position command value $\theta_c$ is input in accordance with a steered position command given from the manipulation mechanism 500. A steering motor position control section 631 generates a current command value Ic to the steering motor 610, based on a deviation $\Delta\theta$ between the steering motor position command value $\theta_c$ and an actual steering motor position $\theta_r$. A current control section 632 controls a PWM drive section 633 to have a motor applied voltage $V_{PWM}$ such that the actual current value Ir is matched with the current command value Ic, namely, a current deviation $\Delta I$ between current command value Ic and actual current value Ir is zero.

A disturbance observer section 710 of a steering axial force estimating section 700 calculates (estimates) a steering axial force $F_{dis}$ applied to the steering rod 620 based on an angular velocity $\omega_r$ obtained by differentiating the actual position $\theta_r$ of the steering motor 610, and a current command value Ic of the steering motor 610, as disclosed in Japanese Laid-Open Patent Publication No. 2002-274405. A constitution example of the disturbance observer section 710 is represented in the following expressions (1) and (2).

$$F_{dis} = [\text{Conversion factor from } T_{dis} \text{ to } F_{dis}] \times T_{dis} \quad (1)$$

$$T_{dis} = -\frac{gs}{s+g} \cdot J\omega_r + \frac{g}{s+g} \cdot K_t \cdot I_c \quad (2)$$

Where $F_{dis}$ is the steering axial force, $T_{dis}$ is the disturbance torque of the steering motor 610, s is Laplacian operator, g is the observer pole, J is the inertia of the steering motor 610, $K_t$ is the torque constant of the steering motor 610, $\omega_r$ is the angular velocity of the steering motor 610, and Ic is a current command value to the steering motor 610.

Conventionally, considering that the current command value Ic and the actual current value Ir are equal under the premises that the current control section 632 (see FIG. 8) of the steering mechanism 600 operates almost ideally, the current command value Ic is employed to calculate (estimate) the steering axial force $F_{dis}$. A counter torque command is generated in accordance with this steering axial force $F_{dis}$. However, when the current control section 632 does not have a sufficiently high gain, the current command value Ic and the actual current value Ir are not necessarily equal. In this case, if the steering axial force $F_{dis}$ is estimated using the current command value Ic, an error might occur.

On the other hand, if the steering motor position control section 631 has a higher gain to enhance the position control performance of the steering motor, the current command value Ic may oscillate due to influence of a backlash or friction of a ball screw provided between the steering motor 610 and the steering rod 620, when the steering axial force $F_{dis}$ applied on the steering motor 610 is reversed. If the steering axial force $F_{dis}$ is estimated using this current command value Ic, an estimated steering axial force $F_{dis}$ may contain some oscillation of the current command value Ic, resulting in a problem that the counter torque may oscillate. FIG. 9 shows an instance in which a counter torque command generated using the current command value Ic oscillates. In the figure, the A and B parts are oscillating.

When the driver continued to perform the steering in a state where the steering rod 620 is subjected to a large steering axial force $F_{dis}$ from the road surface, the following problem arise. For example, when the steering wheel T is subjected to a large resistance due to a bump against the curbstone during the steering, a significant deviation occurs momentarily between the actual position of the steering motor 610 and the steered wheel position command. The steering motor position control section 631 generates a larger current command value Ic to eliminate this deviation. As a result, the current deviation $\Delta I$ momentarily increases, and the actual current value Ir of the steering motor 610 is not matched with the current command value Ic. At this time, the current control section 632 tries to flow the actual current according to the current command value Ic by increasing the applied voltage $V_{PWM}$ to the steering motor 610 via the PWM drive section 633.

When a large steering axial force $F_{dis}$ is applied from the road surface, a larger current is required. However, since the maximum value of voltage applicable to the steering motor 610 is restricted by a battery voltage $V_B$, if the duty ratio of PWM control becomes 100% and the battery voltage $V_B$ is applied (voltage saturation state), any more current cannot be flowed. As a result, the current command value Ic and the actual current value Ir of the steering motor 610 are not matched. When the actual current value Ir of the steering motor 610 does not match the current command value Ic, the position control performance of the steering motor 610 is lower, and the actual position of the steering motor 610 cannot follow the steered wheel position command. In this case, the steering axial force $F_{dis}$ itself is correctly estimated by employing the actual current value Ir, instead of the current command value Ic, in the expression (1).

However, since the information that the motor applied voltage $V_{PWM}$ reaches the battery voltage $V_B$, and that the steering motor 610 cannot follow correctly further turning of the steering wheel 510 is not conveyed to the driver at all, there is a problem that the steering motor 610 cannot follow if the driver continues to further turn the steering wheel 510 without being informed of anything.

SUMMARY OF THE INVENTION

It is an objective of the present invention to provide a vehicle steering apparatus capable of preventing an error or oscillation from occurring in the estimated steering axial force due to influence of a motor control system gain, and suppressing the driver from further turning the steering wheel by increasing the counter torque appropriately when the voltage applied to the steering motor is saturated. The present invention also pertains to a method for controlling such an apparatus.

To achieve the above objective, the present invention provides a steering apparatus. The steering apparatus is used for a vehicle having a steering wheel. The apparatus includes a steering mechanism that is mechanically separate from the steering wheel. The steering mechanism includes a steering rod and a steering motor that drives the steering rod. Steering motor control means generates a command value of a current to be supplied to the steering motor in accordance with the steering position of the steering wheel, and subjects the steering motor to a feedback control based on the generated current command value, thereby controlling the position of the steering rod. Determining means determines whether voltage applied to the steering motor in accordance with the current command value has reached a predetermined voltage. Estimating means selects one of the value of an actual current through the steering motor and the current command value based on the determination result of the determining means. Based on the selected current value, the estimating means estimates an axial force applied to the steering rod. A counter torque motor applies a counter torque to the steering wheel. Counter torque motor control means controls the counter torque motor based on the estimated axial force.

According to another aspect of the invention, a method for controlling a steering apparatus is provided. The steering apparatus is used for a vehicle having a steering wheel. The apparatus includes a steering mechanism that is mechanically separate from the steering wheel and a counter torque motor for applying a counter torque to the steering wheel. The steering mechanism includes a steering rod and a steering motor that drives the steering rod. The method includes a step of generating a command value of a current to be supplied to the steering motor in accordance with the steering position of the steering wheel, and subjecting the steering motor to a feedback control based on the current command value, thereby controlling the position of the steering rod. The method further includes a step of determining whether voltage applied to the steering motor in accordance with the current command value has reached a predetermined voltage, a step of selecting one of the value of an actual current through the steering motor and the current command value based on the determination result, and estimating an axial force applied to the steering rod based on the selected current value; and a step of controlling the counter torque motor based on the estimated axial force.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
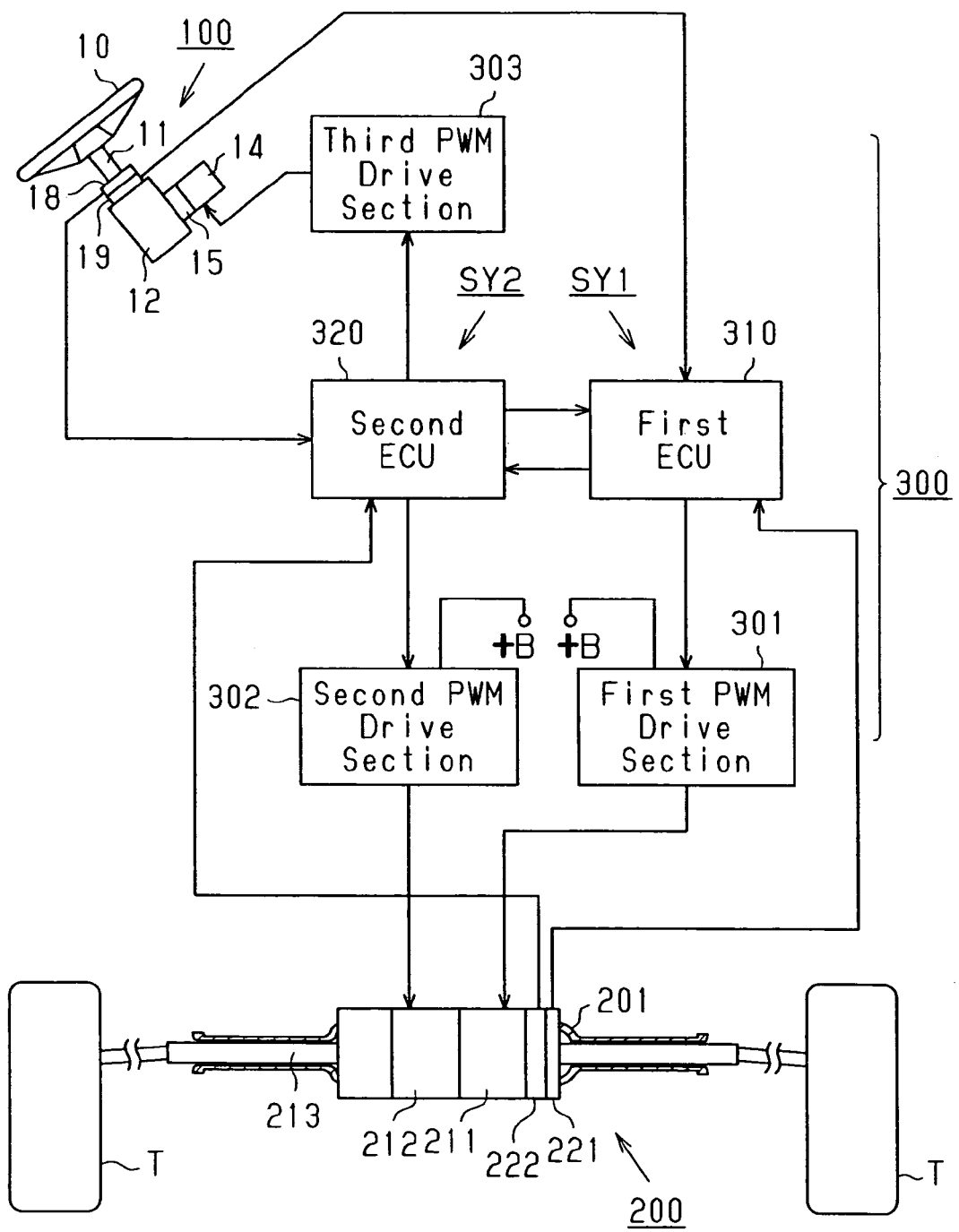
FIG. 1 is a diagrammatic view showing an overall configuration of a steering apparatus according to a first embodiment of the present invention.

In the drawings, like numerals are used for like elements throughout.

Figure 2:
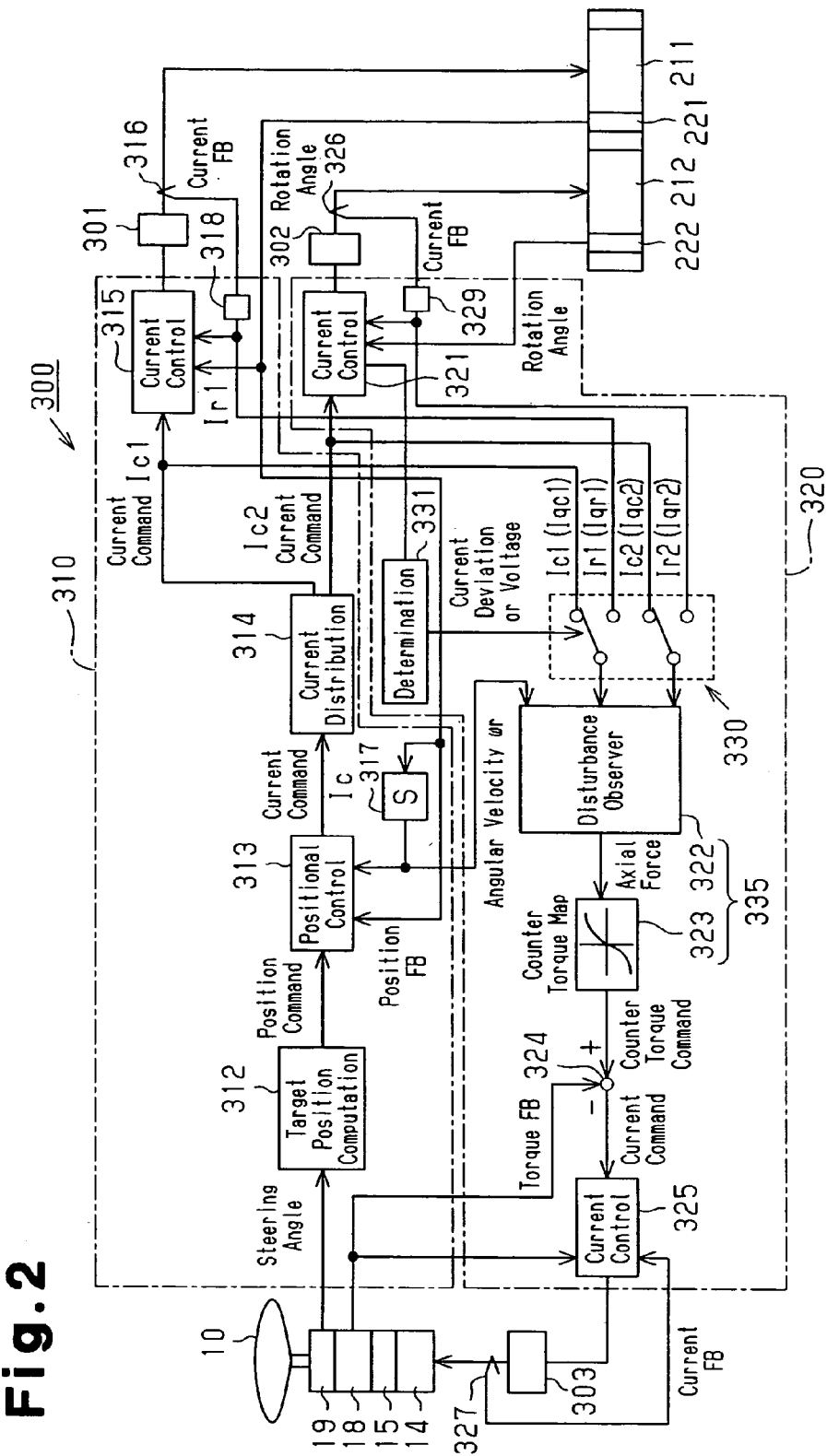
FIG. 2 is a diagrammatic view of a control block.

Referring to FIGS. 1 and 2, a steer-by-wire vehicle steering apparatus mounted on a vehicle according to a first embodiment of the present invention will be described below in detail. FIG. 1 is a diagrammatic view of the steering apparatus according to this embodiment. The steering apparatus includes a manipulation mechanism 100 having a steering wheel 10, a steering mechanism 200, and a controller section 300. The steering wheel 10 of the manipulation mechanism 100 is linked to a steering shaft 11 rotatably supported on the vehicle, not shown.

A counter torque motor 14, that is, a counter force actuator is securely attached to a housing 12. The counter torque motor 14 is a single phase brush DC motor in this embodiment. An output shaft of the counter torque motor 14 is operatively linked via a decelerating mechanism 15 to the steering shaft 11. A torque sensor 18 is able to detect a steering torque of the steering shaft 11. The torque sensor 18 is electrically connected to a second ECU 320 in a second system SY2. A steering wheel angle sensor 19 is able to detect the steering amount, or the steering angle (steering position) of the steering shaft 11, and connected to a first ECU 310 in a first system SY1. The steering wheel angle sensor 19 is a pulse encoder in this embodiment.

(Steering Mechanism 200)

A steering mechanism 200 will be described below. A housing 201 of the steering mechanism 200 is supported on the vehicle body, not shown. Within the housing 201, steering motors 211 and 212 consist of a three phase brushless DC motor, respectively and are disposed on the same axis. The steering motors 211 and 212 function as steering actuators, respectively. In this embodiment, the steering motors 211 and 212 include a stator, not shown, disposed on an inner circumferential face of the housing 201, and a common rotor like a cylinder, not shown, rotatably disposed within the same stator. Within the rotor, a shaft 213 as a steering rod is disposed unrotatably around its axial line but movably in the axial line direction. The shaft 213 and the rotor convert a rotational motion of the rotor into a linear motion of the shaft 213. A well-known motion conversion mechanism converts a rotation of the steering motors 211 and 212 into a change in the steered angle of the steered wheels T. In this embodiment, the motion conversion mechanism consists of a ball screw mechanism. As a result, the motion of the shaft 213 is transmitted via a tie rod and a knuckle arm, not shown, disposed on both end portions of the shaft 213 to the left and right front wheels (steered wheels T).

The steering motors 211 and 212 are controlled by a first PWM drive section 301 and a second PWM drive section 302, respectively. The first PWM drive section 301 and the second PWM drive section 302 have a well known constitution with an inverter composed of a plurality of MOS-FETs to control the driving of the three phase brushless DC motor, and each connected to a battery power source, not shown. The maximum voltage applicable to the steering motors 211 and 212 under the duty control of the first PWM drive section 301 and the second PWM drive section 302 is equal to the battery voltage. A first rotation angle sensor 221 and a second rotation angle sensor 222 are arranged in parallel along the axial direction of the rotor of the steering motors 211 and 212, and detect the rotation angle of the steering motors 211 and 212, respectively. The rotation angle sensors 221 and 222 consist of a rotary encoder, respectively.

Both the rotation angle sensors 221 and 222 input a two phase pulse train signal that has different phase by $\pi/2$ in accordance with a rotation of the rotor and a zero phase pulse train signal representing the reference rotation position to the first ECU 310 and the second ECU 320, respectively. In the following, the signal detected by both the rotation angle sensors 221 and 222 and output are sometimes called a detection signal (including the two phase pulse train signal and the zero phase pulse train signal). The detection signal from the first rotation angle sensor 221 and the second rotation angle sensor 222 are input into the first ECU 310 and the second ECU 320 at a predetermined sampling period. Based on the received detection signals, the first ECU 310 and the second ECU 320 compute a rotation angle of the rotor relative to the stators in the steering motors 211 and 212. This computed rotation angle corresponds to the actual position of the steered wheel angle (actual steered wheel angle) for the steered wheels T. The actual position (the actual steered wheel angle) corresponds to the steering position of the steering mechanism 200, that is the steering position of the shaft 213.

(Controller Section 300)

A controller section 300 as a motor control system, or a controller of the steering apparatus will be described below. The controller section 300 includes the first ECU 310, the second ECU 320, the first PWM drive section 301, the second PWM drive section 302, and a third PWM drive section 303. The third PWM drive section 303 includes an inverter composed of a plurality of MOS-FETs to control the driving of a single-phase brush DC motor. The first PWM drive section 301 and the second PWM drive section 302 drive the steering motors 211 and 212, respectively.

A current sensor 316 and a current sensor 326 are provided to detect the actual motor current of the steering motors 211 and 212 in each phase, as shown in FIG. 2. The actual motor current in each phase detected by the current sensors 316 and 326 are converted into two phases (d axis and q axis) actual motor current by d–q converter sections 318 and 329 (three phase/two phase converting sections). In the following, the two phases (d-axis and q-axis) actual motor current corresponding to three phases actual motor current detected by the current sensors 316 and 326 are simply referred to as the actual current values Ir1, Ir2, respectively. The third PWM drive section 303 drives the counter torque motor 14. As shown in FIG. 2, a current sensor 327 is provided to detect the actual current value of the counter torque motor 14.

The first ECU 310 and the second ECU 320 consist of an electronic control unit having a microcomputer, respectively, and constitute steering motor control means. A first system SY1 includes the first ECU 310, the steering wheel angle sensor 19, the first PWM drive section 301 and the steering motor 211. A second system SY2 includes the second ECU 320, the second PWM drive section 302 and the steering motor 212. The first ECU 310 of the first system SY1 obtains a target position of the steered wheels T, based on a steering angle (steering position) of the steering wheel 10 detected by the steering wheel angle sensor 19, and obtains the current commands for the steering motors 211 and 212, based on a deviation between the target position (target steered wheel angle) and the actual steered wheel angle of the steered wheels T, the current commands being distributed at a predetermined distribution ratio. Each of the ECU 310 or 320 in both systems SY1 and SY2 controls the driving of the steering motors 211 and 212, based on the distributed current commands. The details will be described below.

(First ECU 310)

The first ECU 310 includes a target position computing section 312, a position control section 313, a current distributing section 314, and a current control section 315, in which each means (section) is performed by the first ECU 310, using the control program, as surrounded by the one-dot chain line in FIG. 2. The first ECU 310 and the second ECU 320 as surrounded by the one-dot chain line in FIG. 2 represent a control block, but not a hardware configuration. The first ECU 310 performs the steering control for the steering motor 211 via the first PWM drive section 301 to obtain the steered wheel angle of the steered wheels T corresponding to the steering angle of the steering wheel 10 detected by the steering wheel angle sensor 19 and attain a necessary thrust for the shaft 213, that is the steering axial force for the shaft 213.

Expounding, the target position computing section 312 creates a positional command indicating the target position (target steered wheel angle) of the steered wheels T by referring to a map stored in storage means (e.g., ROM), not shown, based on the steering angle, and outputs the positional command to the position control section 313. The position control section 313 receives the positional command and the rotation angle (corresponding to the actual position (actual steered wheel angle) of the steered wheel angle for the steered wheels T) computed based on a detection signal of the first rotation angle sensor 221, and creates a speed command by feedback controlling the position. The position control section 313 performs the feedback control for the speed based on the speed command and an angular velocity ωr computed and input by a differentiator 317 based on the rotation angle, creates a current command Ic (current command Ic containing two phase current commands of d axis and q axis), and outputs the current command Ic to a current distributing section 314. In this embodiment, the current command of d axis (d-axis current command) of the current commands Ic is always zero.

The current command Ic output to the current distributing section 314 corresponds to the current command value. The current distributing section 314 distributes the supplied current command Ic at predetermined distribution ratio, and supplies a current command Ic1 (including the d-axis and q-axis current commands) and a current command Ic2 (including the d-axis and q-axis current commands), which are distributed, to the current control section 315 of the first system SY1 and the current control section 321 of the second system SY2, respectively. In this embodiment, the distribution ratio at the time of starting the engine for the vehicle (start time control mode) is 50:0 (=Ic1:Ic2), and the distribution ratio in the normal control (normal time control mode) is 50:50 (=Ic1:Ic2).

That is, in this embodiment, the q-axis current command to be supplied to the current control sections 315 and 321 has a distribution ratio of 50:0 at the time of starting the engine for the vehicle (start time control mode), and a distribution ratio of 50:50 in the normal control for the vehicle (normal time control mode). Without regard to the time of starting the engine for the vehicle (start time control mode) and the normal control for the vehicle (normal time control mode), the d-axis current command to be supplied to the current control sections 315 and 321 is always zero in any case. The steering control of the steering motor 211 with the first ECU 310 performs the position control for controlling the steered wheel angle to correspond to the steering angle of the steering wheel 10, and the current control for obtaining a thrust required for the shaft 213 for this control, namely, an output torque. The current control section 315 performs the current control, namely, the current feedback control.

In the start time control mode and the normal time control mode, the current control section 315 receives the current command Ic1, the detection signal (rotation angle) of the first rotation angle sensor 221, and the actual current value Ir1 of the steering motor 211 converted by a d–q converter section 318. The current control section 315 computes a current deviation for each axis between the current command Ic1 (including the d-axis and q-axis current commands) and the actual current value Ir1. The current control section 315 subjects the current deviations in the axes to proportional-plus-integral control to compute voltage command values of d-axis and q-axis, and subjects the voltage command values of d-axis and q-axis to a three-phase conversion, thereby converting the command values of d-axis and q-axis to three-phase voltage command. A motor drive signal subjected to PWM based on the three phase voltage command is output. The first PWM drive section 301 is controlled with a motor drive signal output from the first ECU 310 to make the switching operation to repeatedly excite and shut off the steering motor 211 (PWM control), and flows a motor drive current matched with the current command Ic1 to rotationally drive the steering motor 211. In practice, the d-axis current command included in the current command Ic1 is zero, so that the motor drive current matched with the q-axis current command flows to cause the steering motor 211 to be rotationally driven.

(Second ECU 320)

The second ECU 320 includes a current control section 321, a disturbance observer section 322, a counter torque command generating section 323, a torque control section 324, a current control section 325, a d–q converter section 329, a switching section 330, and a determining section 331, in which each means (section) is performed by the second ECU 320, using the control program, as surrounded by the one-dot chain line in FIG. 2. A steering axial force estimating section 335 is made up of the disturbance observer section 322, and the counter torque command generating section 323.

In the start time control mode and the normal time control mode, the current control section 321 receives the distributed current command Ic2, the detection signal (rotation angle) of the second rotation angle sensor 222, and the actual current value Ir2 for each axis (d axis and q axis) of the steering motor 212 detected by the current sensor 326. The steering control of the steering motor 212 with the second ECU 320 includes the current control for obtaining a thrust required for the shaft 213, namely, an output torque. The current control section 321 performs the current control, namely, the current feedback control. The current control section 321 receives the current command Ic2, the detection signal (rotation angle) of the second rotation angle sensor 222, and the actual current value Ir2 in two phases (d axis and q axis) of the steering motor 212 converted by a d–q converter section 329. The current control section 321 computes a current deviation for each axis between the current command Ic2 (including the d-axis and q-axis current commands) and the actual current value Ir2.

The current control section 321 subjects the deviations to proportional-plus-integral control to compute voltage command values of d-axis and q-axis, and subjects the voltage command values of d-axis and q-axis to a three-phase conversion, thereby converting the command values of d-axis and q-axis to three-phase voltage command. A motor drive signal subjected to PWM based on the three phase voltage command is output. The second PWM drive section 302 is controlled with a motor drive signal output from the second ECU 320 to make the switching operation to excite and shut off the steering motor 212 (PWM control), and flows a motor drive current matched with the current command Ic2 to rotationally drive the steering motor 212. In practice, the d-axis current command included in the current command Ic2 is zero, so that the motor drive current matched with the q-axis current command flows to cause the steering motor 212 to be rotationally driven.

In this manner, the steering of the steered wheels T to the target steered wheel angle is performed in the steering mechanism 200 by controlling the driving of the steering motors 211 and 212, and synthesizing their outputs. Though control of the steering motors at the normal time of both the systems SY1 and SY2 has been described above, when one system SY1 or SY2 breaks down, the control program enables the remaining normal system ECU 310 or 320 to perform the functions of the target position computing section 312 to the current control section 315. In this case, the detection signal from each sensor such as torque sensor 18 and steering wheel angle sensor 19, which is input into the corresponding system SY1 or SY2, is sent from the down system ECU 310 or 320 to the normal system ECU 310 or 320, when needed. The normal system SY1 or SY2 controls the output of the corresponding steering motor 211 or 212 of control object to be higher than when both the systems SY1 and SY2 are normal.

(Application of Counter Torque)

A constitution for applying a counter torque (counter force) to the steering wheel 10 will be described below. The differentiator 317 of the first ECU 310 differentiates the rotation angle detected by the first rotation angle sensor 221 to obtain the angular velocity ωr, and inputs the obtained angular velocity ωr into the disturbance observer section 322 of the second ECU 320. The d–q converter section 318 and the d–q converter section 329 input the actual current values Ir1 and Ir2 of the steering motors 211 and 212 via the switching section 330 into the disturbance observer section 322.

The determining section 331 determines whether the q-axis current deviation of the current deviations for the axes computed by the current control section 321 is no more than a predetermined threshold value. When the current control section 321 creates a voltage command based on the predetermined threshold value of this embodiment, and the second PWM drive section 302 outputs a motor drive signal subjected to PWM based on this voltage command, the motor terminal voltage applied via the second PWM drive section 302 to the steering motor 212 reaches the battery voltage. The battery voltage corresponds to the predetermined voltage of the invention. That is, the predetermined voltage is the maximum value of voltage that can be applied to the steering motors 211, 212. The reason why it is determined whether the q-axis current deviation is no more than the predetermined threshold value is that the q-axis current decides the output torque of the steering motor.

(A Case Where the Current Deviation is No More Than the Predetermined Threshold Value)

When the q-axis current deviation of the current deviations for the axes computed by the current control section 321 is no more than the predetermined threshold value, the determining section 331 makes a connection to input the actual current values Ir1 and Ir2 of the steering motors 211 and 212 via the switching section 330 into the disturbance observer section 322. The disturbance observer section 322 estimates the steering axial force acting on the shaft 213, based on the input angular velocity ωr and the actual current values Ir1 and Ir2. That is, the disturbance observer section 322 computes the steering axial force $F_{dis}$ by substituting the angular velocity ωr and the q-axis actual current values Iqr1 and Iqr2 of the actual current values Ir1 and Ir2 for the following expressions (3) and (4).

$$F_{dis} = [\text{Conversion factor from } T_{dis} \text{ to } F_{dis}] \times T_{dis} \quad (3)$$

$$T_{dis} = \left(-\frac{gs}{s+g} \cdot J1 \cdot \omega_r + \frac{g}{s+g} \cdot K_{t1} \cdot I_{qr1}\right) + \left(-\frac{gs}{s+g} \cdot J2 \cdot \omega_r + \frac{g}{s+g} \cdot K_{t2} \cdot I_{qr2}\right) \quad (4)$$

In the expression of this embodiment, $F_{dis}$ is the steering axial force, $T_{dis}$ is the sum of disturbance torques for both the steering motors 211 and 212, s is Laplacian operator, g is the observer pole, J1 is the inertia of the steering motor 211, $K_t1$ is the torque constant of the steering motor 211, ωr is the angular velocity of the steering motor 211, and Iqr1 is the q-axis actual current value of the steering motor 211. J2 is the inertia of the steering motor 212, $K_t2$ is the torque constant of the steering motor 212, and Iqr2 is the q-axis actual current value of the steering motor 212. Accordingly, as seen from the expression (4), when the angular velocity ωr is negative, $T_{dis}$ is greater than when ωr is positive, whereby the steering axial force $F_{dis}$ computed by the expression (3) is greater.

(A Case Where the Current Deviation is Greater Than the Predetermined Threshold Value)

When the q-axis current deviation of the current deviations for the axes computed by the current control section 321 is greater than the predetermined threshold value, the determining section 331 makes a connection to input the current commands Ic1 and Ic2 distributed for the steering motors 211 and 212 via the switching section 330 into the disturbance observer section 322. Accordingly, in this case, the disturbance observer section 322 computes the virtual steering axial force $F_{dis}$ acting on the shaft 213, based on the input angular velocity ωr and the distributed current commands Ic1 and Ic2. That is, the disturbance observer section 322 computes the virtual steering axial force $F_{dis}$ in accordance with the expression (3) by substituting the angular velocity ωr and the q-axis current commands Iqc1 and Iqc2 of the current commands Ic1 and Ic2 for the following expression (5) and summing the disturbance torque for both the steering motors 211 and 212.

$$T_{dis} = \left(-\frac{gs}{s+g} \cdot J1 \cdot \omega_r + \frac{g}{s+g} \cdot K_{t1} \cdot I_{qc1}\right) + \left(-\frac{gs}{s+g} \cdot J2 \cdot \omega_r + \frac{g}{s+g} \cdot K_{t2} \cdot I_{qc2}\right) \quad (5)$$

In the expression (5), Iqc1 is the q-axis current command of the steering motor 211, and Iqc2 is the q-axis current command of the steering motor 212. The counter torque command generating section 323 obtains, as a counter torque command, a counter torque necessary to attain a counter torque by referring to a counter torque map stored in storage means, not shown, based on the steering axial force $F_{dis}$ estimated or computed by the disturbance observer section 322, and outputs the obtained counter torque command to the torque control section 324. The torque control section 324 computes a deviation between the steering torque input from the torque sensor 18 and the counter torque command, and applies the deviation as the current command of counter torque to the current control section 325. That is, the torque feedback control is made. In this manner, the second ECU 320 of the controller section 300 has a control loop for making the torque feedback control based on the steering torque obtained from the torque sensor 18.

The current control section 325 receives the current command of the counter torque and the actual current value of the counter torque motor 14 detected by the current sensor 327. The current control section 325 rotationally drives the counter torque motor 14 by flowing a motor drive current matched with the current command to resolve the deviation between the actual current value and current command. In this manner, the counter torque motor 14 is driven and controlled, so that a counter torque in a reverse direction to the steering direction of the steering wheel 10 is applied to the steering wheel 10. As a result, to turn the steering wheel 10, a turning torque against the counter torque generated by the counter torque motor 14 is required.

(Operation)

Figure 3:
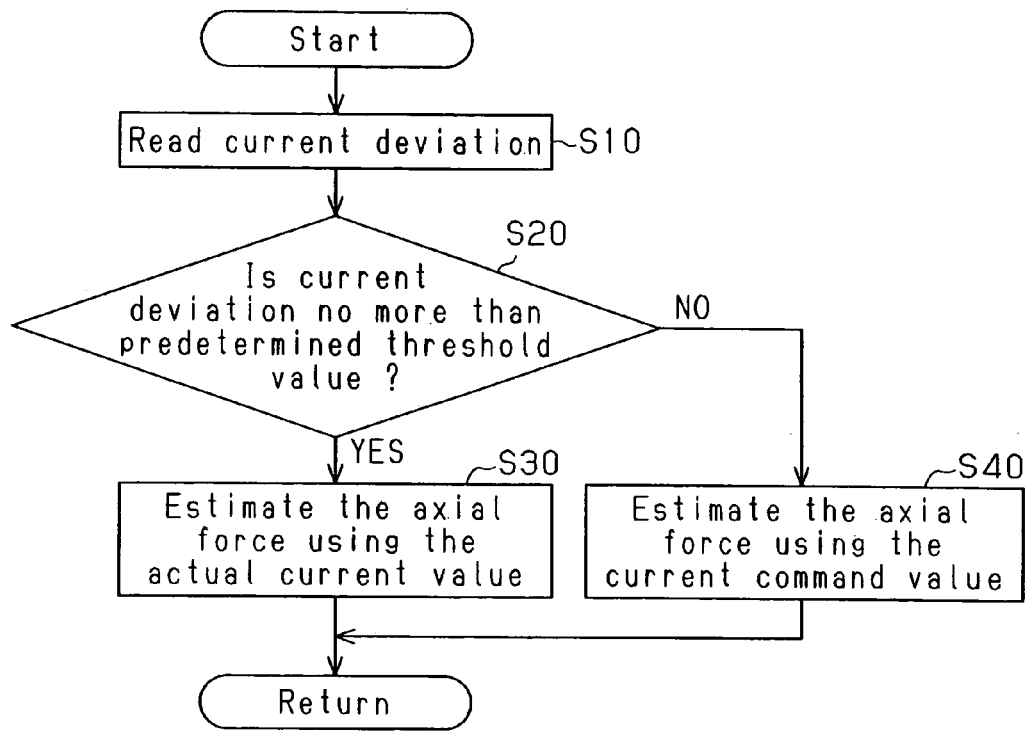
FIG. 3 is a flowchart of an axial force estimation control program to be executed by a second ECU.

The operation of the steering apparatus constituted in the above manner will be described below. FIG. 3 is a flowchart of an axial force estimation control program performed by the second ECU 320 in this embodiment, in which this program is executed at every predetermined period. Entering the process of this control program, at S10 (S denotes the step), the q-axis current deviation computed by the current control section 321 is read. At S20, it is determined whether or not the read q-axis current deviation is no more than the predetermined threshold value. The determining section 331 and the switching section 330 perform the processing at S20. If the q-axis current deviation is no more than the predetermined threshold value at S20, the steering axial force $F_{dis}$ is estimated using the q-axis actual current values Iqr1 and Iqr2 at S30. Thereafter, this control program is ended. On the other hand, if the current deviation is greater than the predetermined threshold value at S20, the procedure goes to S40, where the virtual steering axial force $F_{dis}$ is computed using the current commands Ic1 and Ic2.

Accordingly, with the above constitution, if the motor terminal voltage, that is, the applied voltage is saturated while steering the steering wheel 10, the procedure goes to S10, S20 and S40, whereby the virtual steering axial force $F_{dis}$ is computed using the current command $Ic_1$ and Ic2. Since the counter torque motor 14 is driven and controlled based on the virtual steering axial force $F_{dis}$ computed using the increased current command, the counter torque applied on the steering wheel 10 is increased, suppressing the wheel 10 from being further steered.

This embodiment provides the following advantages.

(1) In the steer-by-wire steering apparatus of this embodiment, the q-axis current commands Iqc1 and Iqc2 of the steering motors 211 and 212 are generated in accordance with the steering angle (steering position) of the steering wheel 10. The steering apparatus includes the first ECU 310 and the second ECU 320 (steering motor control means) for controlling the actual position of the steered wheel angle for the steered wheels T (steered wheel position of the steering mechanism 200) via the steering motors 211 and 212 by performing the current feedback control based on the q-axis current commands Iqc1 and Iqc2. Moreover, the second ECU 320, as the determining means, determines whether or not the q-axis current deviation is greater than the predetermined threshold value, that is whether or not the motor terminal voltage applied to the steering motor 212 is increased and reaches the battery voltage (predetermined voltage) in accordance with the current command of the steering motor 212.

The second ECU 320, as the axial force estimating means, selects either the q-axis actual current values Iqr1 and Iqr2 of the steering motors 211 and 212 or the q-axis current commands Iqc1 and Iqc2 of the steering motors 211 and 212 in accordance with the determination result. The second ECU 320 computes the steering axial force $F_{dis}$ of the shaft 213 (steering rod), based on the selected current value. Moreover, the second ECU 320, as the counter torque motor control means, controls the counter torque motor 14 for applying the counter torque to the steering wheel 10 in accordance with the computed steering axial force $F_{dis}$. As a result, in performing the rapid steering, if the motor terminal voltage reaches the predetermined voltage during the steering, the counter torque is increased by the counter torque motor 14, suppressing the wheel 10 from being further steered.

(2) In the steering apparatus of the first embodiment, the second ECU 320 (determining means) determines whether or not the motor terminal voltage reaches the battery voltage (predetermined voltage), depending on whether or not the deviation between the q-axis current command Iqc2 and the q-axis actual current value Iqr2 of the steering motor 212 reaches the predetermined threshold value. As a result, the operation of the above advantage (1) is easily provided.

(3) When the q-axis current deviation is no more than the predetermined threshold value, the steering axial force $F_{dis}$ is estimated using the actual current values Iqr1 and Iqr2. Therefore, if the current control sections 315 and 321 do not have a sufficiently high gain or the current command values Iqc1 and Iqc2 may oscillate due to influence of a backlash or friction of the ball screw provided between the steering motors 211, 212 and the shaft 213 when the steering axial force $F_{dis}$ applied on the steering motor 211, 212 is reversed, an error or oscillation occurring in the estimated steering axial force $F_{dis}$ is prevented. As a result, an oscillation occurring in the the counter torque is prevented.

Second Embodiment

Figure 5:
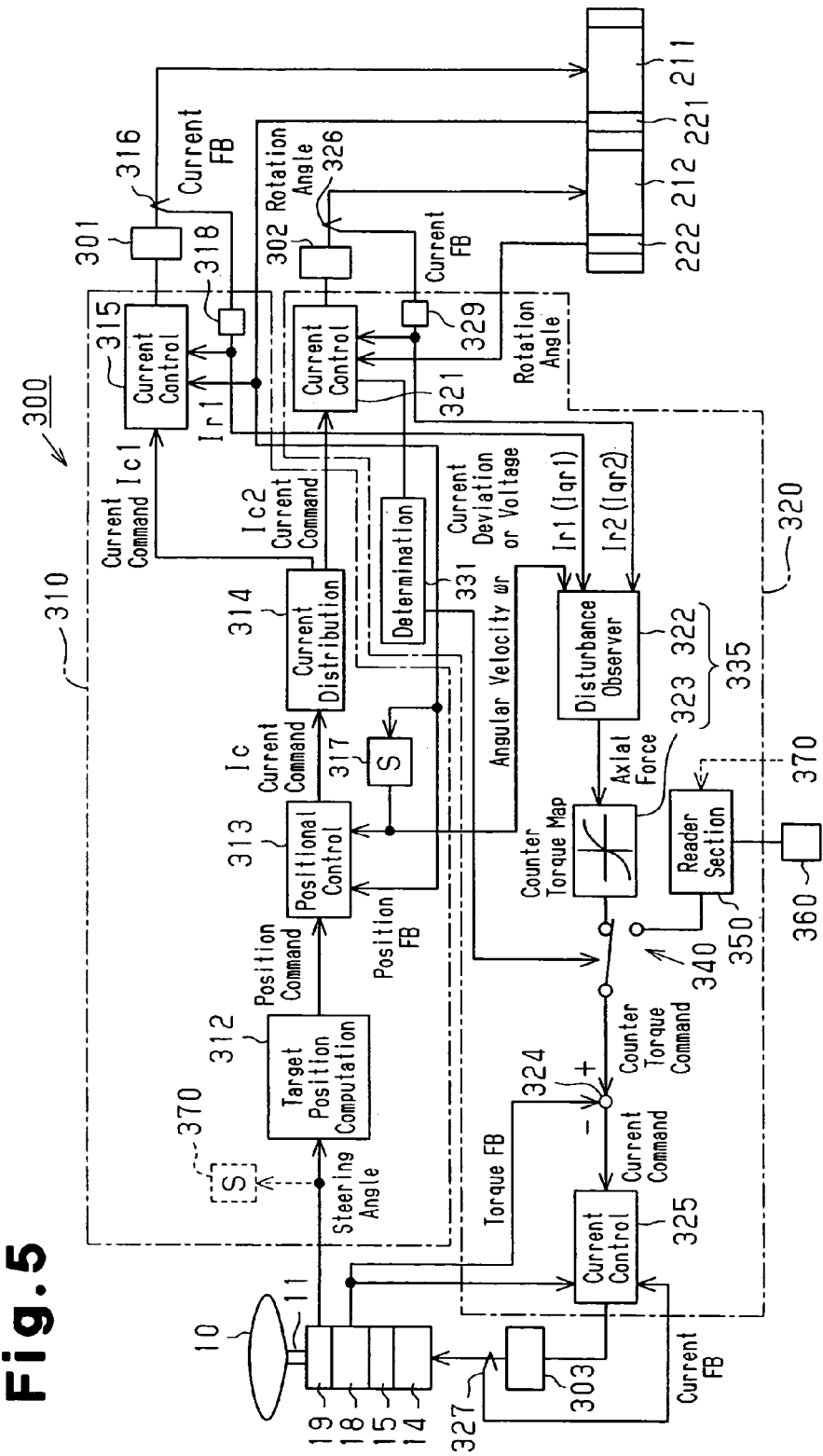
FIG. 5 is a diagrammatic view of a control block according to a second embodiment of the invention.

A second embodiment will now be described with reference to FIGS. 5 and 6 (a). A control block is shown with the first ECU 310 and the second ECU 320 as surrounded by the one-dot chain line in FIG. 5, but this figure does not represent the hardware configuration.

Like or the same reference numerals are given to those components that are like or the same as the corresponding components of the first embodiment. Mainly, the differences from the first embodiment will be discussed below. In the second embodiment, the switching section 330 of the first embodiment is omitted. The disturbance observer section 322 can receive the actual current values Ir1 (q-axis actual current value Iqr1) and Ir2 (q-axis actual current value Iqr2) in the same manner as conventionally. In the second embodiment, a switching section 340, a reader section 350 and a storage section 360 are provided.

The storage section 360 is storage means composed of ROM to function as counter torque data storing means, and stores a specified counter torque setting value. The specified counter torque setting value is preset to be greater than the counter torque command generated by the counter torque command generating section 323 before the predetermined voltage (battery voltage) is reached as described in the first embodiment. Alternatively, the specified counter torque setting value may be set to a value greater than the counter torque command, which is estimated immediately before the terminal voltage reaches the predetermined voltage, every time the terminal voltage reaches the predetermined voltage. In the second embodiment, the specified counter torque setting value is fixed.

The determining section 331 determines whether or not the q-axis current deviation computed by the current control section 321 is no more than the predetermined threshold value in the same manner as in the first embodiment. If the q-axis current deviation is no more than the predetermined threshold value, the determining section 331 outputs the output of the counter torque command generating section 323 via the switching section 340 to the torque control section 324. If the q-axis current deviation is greater than the predetermined threshold value, the determining section 331 outputs the specified counter torque setting value of the storage section 360 read by the reader section 350 via the switching section 340 to the torque control section 324.

(Operation)

Figure 6A:
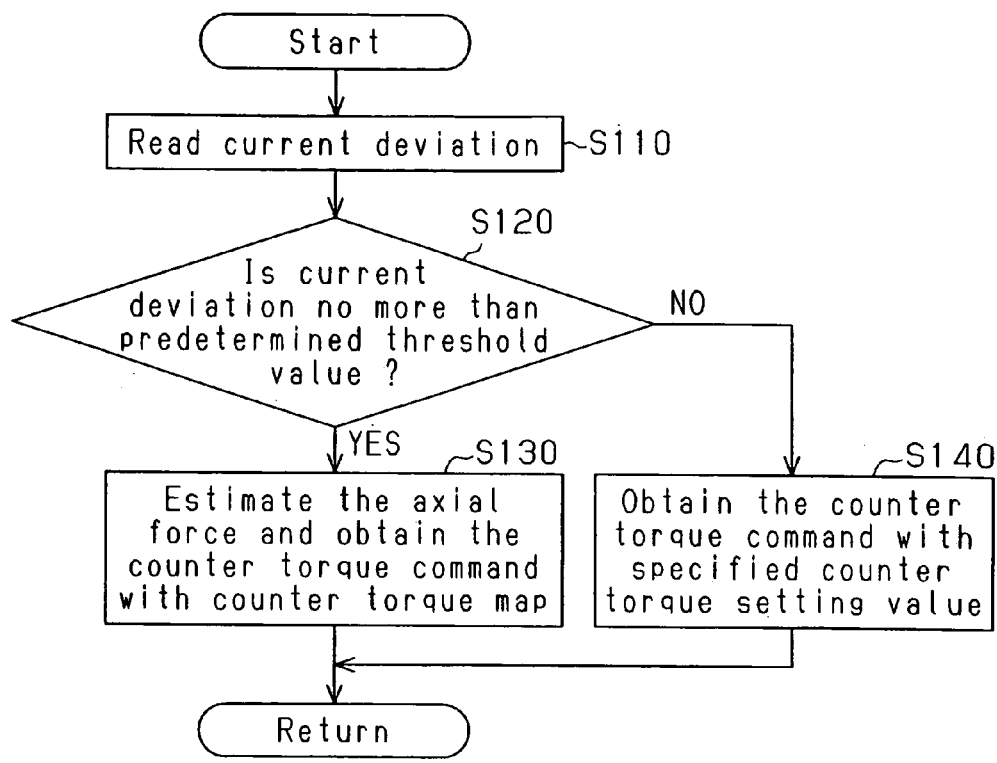
FIG. 6(a) is a flowchart of a counter torque command generation control program to be executed by the second ECU.

The operation of the steering apparatus constituted in the above manner will be described below. FIG. 6(a) is a flowchart of a counter torque command generation control program performed by the second ECU 320 in the second embodiment, in which this program is executed at every predetermined period. Entering the process of this control program, at S110, the q-axis current deviation computed by the current control section 321 is read. At S120, it is determined whether or not the read q-axis current deviation is no more than the predetermined threshold value. The determining section 331 and the switching section 340 perform the processing at S120. If the q-axis current deviation is no more than the predetermined threshold value at S120, the steering axial force $F_{dis}$ is estimated using the q-axis actual current values Iqr1 and Iqr2 and the counter torque command is obtained with the counter torque map at S130. This obtained counter torque command is output to the torque control section 324, and the control program is ended.

On the other hand, if the q-axis current deviation is greater than the predetermined threshold value at S120, the procedure goes to S140, where the specified counter torque setting value is output as the counter torque command to the torque control section 324. Thereafter, this control program is ended. Accordingly, with the above constitution, if the motor terminal voltage is saturated while steering the steering wheel 10, the procedure goes to S110, S120 and S140, whereby the counter torque obtained using the counter torque command with the specified counter torque setting value is applied to the steering wheel 10 by the counter torque motor 14. Accordingly, the counter torque applied to the steering wheel 10 is increased.

The second embodiment provides the following advantages.

(1) In the steer-by-wire steering apparatus of this embodiment, the q-axis current commands Iqc1 and Iqc2 of the steering motors 211 and 212 are generated in accordance with the steering angle (steering position) of the steering wheel 10. The steering apparatus includes the first ECU 310 and the second ECU 320 (steering motor control means) for controlling the actual position of the steered wheel angle for the steered wheels T (steered wheel position of the steering mechanism 200) via the steering motors 211 and 212 by performing the current feedback control based on the q-axis current commands Iqc1 and Iqc2. Moreover, the second ECU 320, as the determining means, determines whether or not the q-axis current deviation is greater than the predetermined threshold value, that is whether or not the motor terminal voltage applied to the steering motor 212 is increased and reaches the battery voltage (predetermined voltage) in accordance with the current command of the steering motor 212.

The second ECU 320, as the axial force estimating means, estimates the steering axial force $F_{dis}$ of the shaft 213 (steering rod) based on the q-axis actual current values Iqr1 and Iqr2 of the steering motors 211 and 212. The storage section 360, as the counter torque data storing means, stores the specified counter torque setting value (counter torque data) that is greater than the counter torque applied to the steering wheel 10 in accordance with the steering axial force $F_{dis}$ estimated before the motor terminal voltage applied to the steering motor 212 reaches the predetermined voltage (battery voltage). Moreover, the second ECU 320, as the counter torque motor control means, controls the counter torque motor 14 for applying the counter torque to the steering wheel 10 in accordance with the steering axial force $F_{dis}$, estimated based on the determination result, or the specified counter torque setting value.

Consequently, it is possible to obtain the stable estimated axial force $F_{dis}$ not affected by the motor control system gain before the motor terminal voltage reaches the predetermined voltage. Moreover, if the motor terminal voltage reaches the predetermined voltage during the steering, the counter torque is increased by the counter torque motor 14, suppressing the wheel from being further steered.

The invention may be embodied in the following forms.

Though the determining section 331 determines whether or not the current deviation computed by the current control section 321 is no more than the predetermined threshold value in the first embodiment, the determining section 331 may be provided on the first ECU 310, and determines based on the current deviation computed by the current control section 315.

Figure 4:
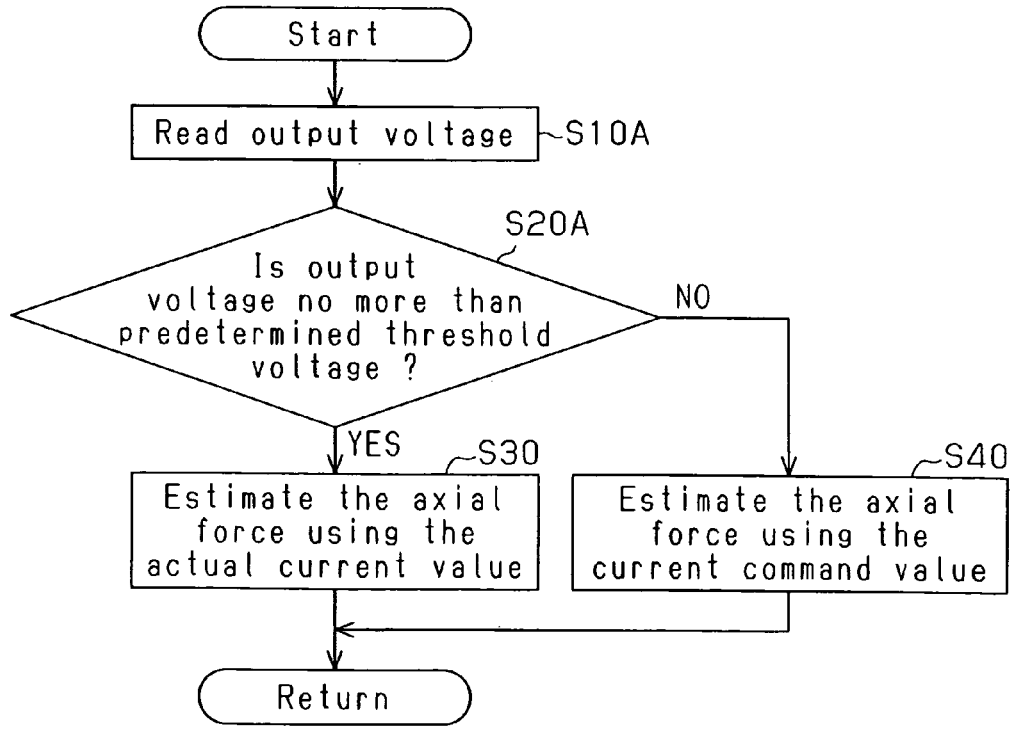
FIG. 4 is a flowchart of a control program to be executed by the second ECU according to a variant of the first embodiment.

Though the second ECU 320 is based on the current deviation to make the determination in the first embodiment, the motor terminal voltage may be employed. That is, it is determined whether or not the output voltage of the first PWM drive section 301 is no more than the predetermined voltage based on the voltage command output from the current control section 315. In this case, the flowchart is altered to S10A and S20A, instead of S10 and S20, as shown in FIG. 4. At S10A, the output voltage is read, and at S20A, it is determined whether or not the read output voltage is no more than the predetermined voltage. Other steps are the same as in the first embodiment.

The predetermined voltage is the battery voltage in the above embodiments, but may not be necessarily limited to the battery voltage. When the battery voltage is Vb, the value Vb-α may be the predetermined voltage. In this case, it is preferable that α is a smaller value than 1V, such as 0.5V.

Figure 6B:
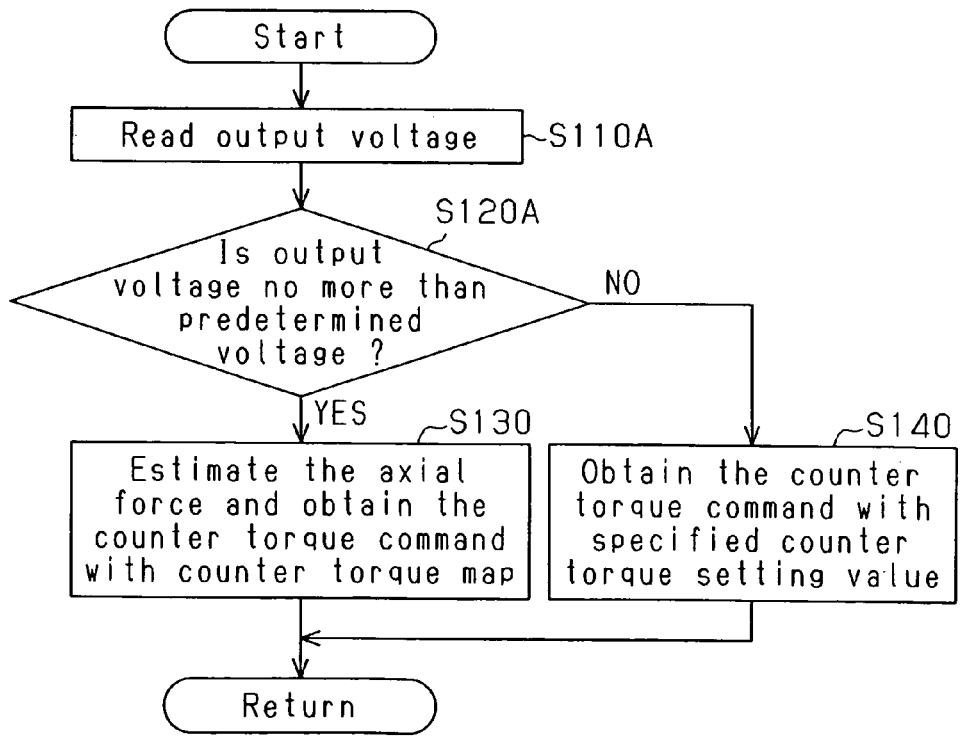
FIG. 6(b) is a flowchart of a counter torque command generation control program to be executed by the second ECU according to a variant of the second embodiment.
Figure 7:
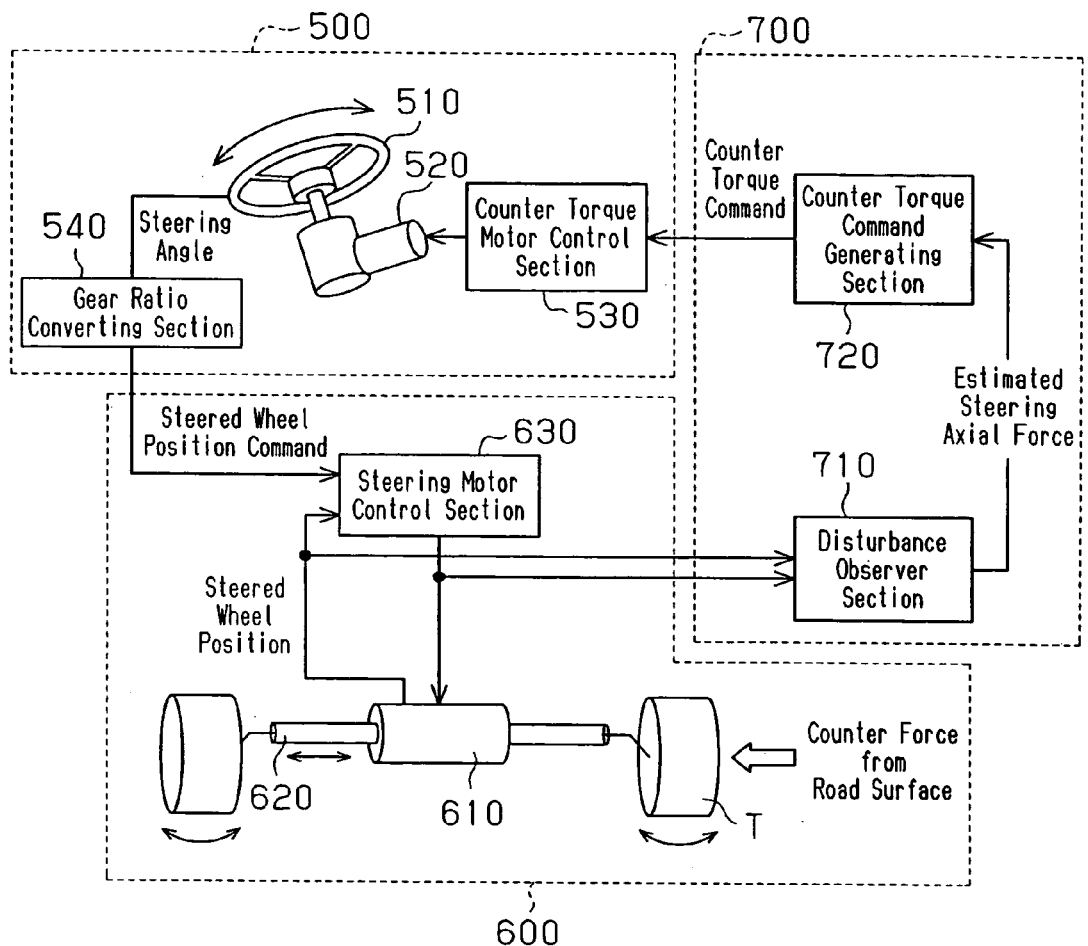
FIG. 7 is a diagrammatic view of a conventional steer-by-wire vehicle steering apparatus.
Figure 8:
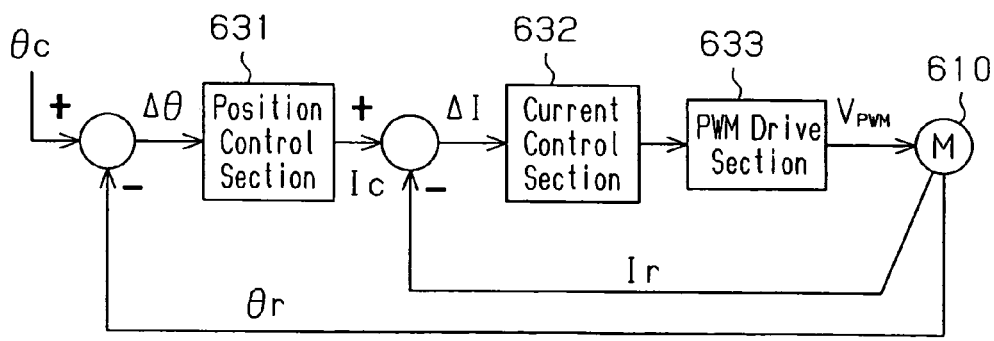
FIG. 8 is a control block diagram of a steering motor control section 630 in the steering mechanism 600 in the prior art.
Figure 9:
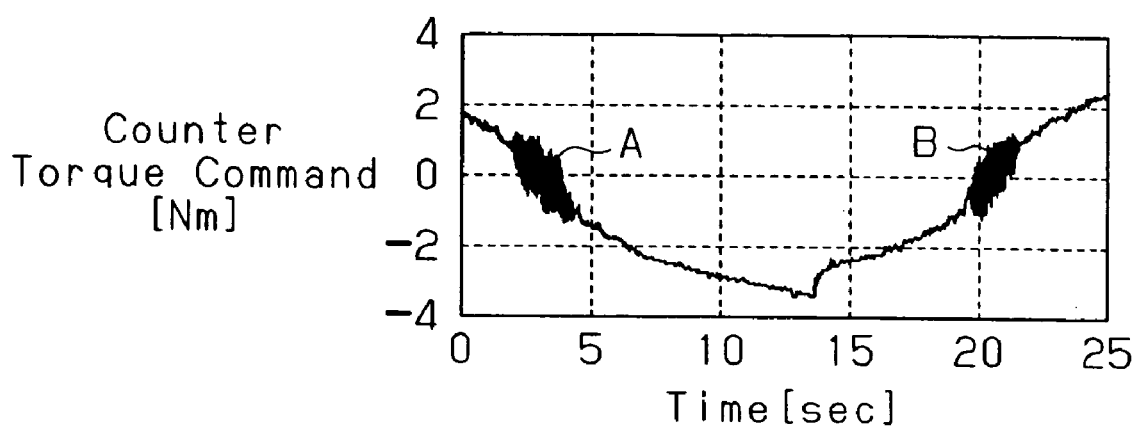
FIG. 9 is a time chart of a counter torque motor command.

In the second embodiment, the second ECU 320 makes the determination based on the current deviation, but may be based on the motor terminal voltage. That is, it is determined whether or not the output voltage of the second PWM drive section 302 is no more than the predetermined voltage based on the voltage command output from the current control section 321. In this case, the flowchart is altered to S110A and S120A, instead of S110 and S120, as shown in FIG. 6(b). At S110A, the output voltage is read, and at S120A, it is determined whether or not the read output voltage is no more than the predetermined voltage. Other steps are the same as in the second embodiment.

The specified counter torque setting value is fixed in the second embodiment, but may be variable. For example, the steering angle rate and the counter torque data are mapped and stored in the storage section 360 to acquire the different counter torque command in accordance with the steering angle rate. The steering angle of the steering wheel 10 is detected by the steering wheel angle sensor 19, and differentiated by the differentiator 370 (see FIG. 5) to obtain the steering angle rate. The obtained steering angle rate is input into the reader section 350, and the counter torque data is indexed in accordance with the vehicle speed. In this case, the specified counter torque setting value as the counter torque data is greater than the counter torque applied to the steering wheel 10 obtained based on the estimated steering axial force $F_{dis}$, before the predetermined voltage (battery voltage) is reached.

The present examples and embodiments are to be considered as illustrative and not restrictive and the invention is not to be limited to the details given herein, but may be modified within the scope and equivalence of the appended claims.

The invention claimed is:

1. A steering apparatus for a vehicle having a steering wheel, the apparatus comprising:

a steering mechanism that is mechanically separate from the steering wheel, wherein the steering mechanism includes a steering rod and a steering motor that drives the steering rod;

steering motor control means, which generates a command value of a current to be supplied to the steering motor in accordance with the steering position of the steering wheel, and subjects the steering motor to a feedback control based on the generated current command value, thereby controlling the position of the steering rod;

determining means, which determines whether voltage applied to the steering motor in accordance with the current command value has reached a predetermined voltage;

estimating means, which selects one of the value of an actual current through the steering motor and the current command value based on the determination result of the determining means, wherein, based on the selected current value, the estimating means estimates an axial force applied to the steering rod;

a counter torque motor for applying a counter torque to the steering wheel; and counter torque motor control means, which controls the counter torque motor based on the estimated axial force.

2. The apparatus according to claim 1, wherein, when the voltage applied to the steering motor has not reached the predetermined voltage, the axial force estimating means selects the actual current value, and, when the applied voltage has reached the predetermined voltage, the axial force estimating means selects the current command value.

3. The apparatus according to claim 1, wherein the predetermined voltage is the maximum value of voltage that can be applied to the steering motor.

4. The apparatus according to claim 1, wherein the predetermined voltage is the voltage of a battery mounted on the vehicle.

5. The apparatus according to claim 1, wherein the determining means determines whether the applied voltage has reached the predetermined voltage based on whether the deviation between the current command value of the steering motor and the actual current value has reached a predetermined threshold value.

6. The apparatus according to claim 5, wherein, when the deviation has not reached the predetermined threshold value, the determining means determines that the voltage applied to the steering motor has not reached the predetermined voltage, and, when the deviation has reached the predetermined threshold value, the determining means determines that the applied voltage has reached the predetermined voltage.

7. A steering apparatus for a vehicle having a steering wheel, the apparatus comprising:

a steering mechanism that is mechanically separate from the steering wheel, wherein the steering mechanism includes a steering rod and a steering motor that drives the steering rod;

steering motor control means, which generates a command value of a current to be supplied to the steering motor in accordance with the steering position of the steering wheel, and subjects the steering motor to a feedback control based on the generated current command value, thereby controlling the position of the steering rod;

a counter torque motor for applying a counter torque to the steering wheel;

determining means, which determines whether voltage applied to the steering motor in accordance with the current command value has reached a predetermined voltage;

estimating means, which estimates an axial force applied to the steering rod based on the value of an actual current through the steering motor;

storage means for storing data used for determining a counter torque to be applied to the steering wheel; and counter torque motor control means, which controls the counter torque motor, thereby applying a counter torque to the steering wheel, wherein, when the applied voltage has not reached the predetermined voltage, the counter torque motor control means determines the counter torque based on the estimated axial force, when the applied voltage has reached the predetermined voltage, the counter torque motor control means determines the counter torque based on the data stored in the storage means, and wherein the counter torque that is determined based on the data is greater than the counter torque that is determined when the applied voltage has not reached the predetermined voltage.

8. The apparatus according to claim 7, wherein the data stored in the storage means is preset according to a steering angle rate of the steering wheel, and wherein the counter torque motor control means determines the counter torque according to the steering angle rate.

9. The apparatus according to claim 7, wherein the data stored in the storage means is a predetermined fixed value.

10. The apparatus according to claim 7, wherein the data stored in the storage means is determined such that a counter torque applied to the steering wheel based on the data is greater than a counter torque that is determined based on an axial force estimated immediately before the voltage applied to the steering motor reaches the predetermined voltage.

11. The apparatus according to claim 7, wherein the predetermined voltage is the maximum value of voltage that can be applied to the steering motor.

12. The apparatus according to claim 7, wherein the predetermined voltage is the voltage of a battery mounted on the vehicle.

13. The apparatus according to claim 7, wherein the determining means determines whether the applied voltage has reached the predetermined voltage based on whether the deviation between the current command value of the steering motor and the actual current value has reached a predetermined threshold value.

14. The apparatus according to claim 13, wherein, when the deviation has not reached the predetermined threshold value, the determining means determines that the applied voltage has not reached the predetermined voltage, and, when the deviation has reached the predetermined threshold value, the determining means determines that the applied voltage has reached the predetermined voltage.

15. A steering apparatus for a vehicle having a steering wheel, the apparatus comprising:

a steering mechanism that is mechanically separate from the steering wheel, wherein the steering mechanism includes a steered wheel and a steering actuator that drives the steered wheel;

a counter force actuator for applying a counter force to the steering wheel;

a controller, which generates a command value of a current to be supplied to the steering actuator in accordance with the steering position of the steering wheel, and subjects the steering actuator to a feedback control based on the generated current command value, thereby controlling the steered angle of the steered wheel, wherein the controller determines whether voltage applied to the steering actuator in accordance with the current command value has reached a predetermined voltage, selects one of the value of an actual current through the steering actuator and the current command value based on the determination result, and controls the counter force actuator based on the selected current value.

16. The apparatus according to claim 15, wherein, when the voltage applied to the steering actuator has not reached the predetermined voltage, the controller selects the actual current value, and, when the applied voltage has reached the predetermined voltage, the controller selects the current command value.

17. A steering apparatus for a vehicle having a steering wheel, the apparatus comprising:
a steering mechanism that is mechanically separate from the steering wheel, wherein the steering mechanism includes a steered wheel and a steering actuator that drives the steered wheel;
a counter force actuator for applying a counter force to the steering wheel;
a memory for storing data used for determining a counter force to be applied to the steering wheel; and
a controller, which generates a command value of a current to be supplied to the steering actuator in accordance with the steering position of the steering wheel, and subjects the steering actuator to a feedback control based on the generated current command value, thereby controlling the steered angle of the steered wheel, wherein the controller controls the counter force actuator to apply a counter force to the steering wheel, and determines whether voltage applied to the steering actuator in accordance with the current command value has reached a predetermined voltage, wherein, when the applied voltage has not reached the predetermined voltage, the controller determines the counter force based on the value of an actual current through the steering actuator, and when the applied voltage has reached the predetermined voltage, determines the counter force based on the data stored in the memory, and wherein the counter force that is determined based on the data is greater than the counter force that is determined when the applied voltage has not reached the predetermined voltage.

18. A method for controlling a steering apparatus for a vehicle having a steering wheel, wherein the apparatus includes a steering mechanism that is mechanically separate from the steering wheel and a counter torque motor for applying a counter torque to the steering wheel, wherein the steering mechanism includes a steering rod and a steering motor that drives the steering rod, the method comprising:
generating a command value of a current to be supplied to the steering motor in accordance with the steering position of the steering wheel, and subjecting the steering motor to a feedback control based on the current command value, thereby controlling the position of the steering rod;
determining whether voltage applied to the steering motor in accordance with the current command value has reached a predetermined voltage;
selecting one of the value of an actual current through the steering motor and the current command value based on the determination result, and estimating an axial force applied to the steering rod based on the selected current value; and
controlling the counter torque motor based on the estimated axial force.

19. The method according to claim 18, wherein, when the voltage applied to the steering motor has not reached the predetermined voltage, the actual current value is selected, and, when the applied voltage has reached the predetermined voltage, the current command value is selected.

20. A method for controlling a steering apparatus for a vehicle having a steering wheel, wherein the apparatus includes a steering mechanism that is mechanically separate from the steering wheel and a counter torque motor for applying a counter torque to the steering wheel, wherein the steering mechanism includes a steering rod and a steering motor that drives the steering rod, the method comprising:
generating a command value of a current to be supplied to the steering motor in accordance with the steering position of the steering wheel, and subjecting the steering motor to a feedback control based on the current command value, thereby controlling the position of the steering rod;
determining whether voltage applied to the steering motor in accordance with the current command value has reached a predetermined voltage;
estimating an axial force applied to the steering rod based on the value of an actual current through the steering motor;
storing data used for determining a counter torque to be applied to the steering wheel; and
controlling the counter torque motor, thereby applying a counter torque to the steering wheel, wherein, when the applied voltage has not reached the predetermined voltage, the counter torque is determined based on the estimated axial force, when the applied voltage has reached the predetermined voltage, the counter torque is determined based on the stored data, and wherein the counter torque that is determined based on the data is greater than the counter torque that is determined when the applied voltage has not reached the predetermined voltage.

* * * * *